Figure 1:
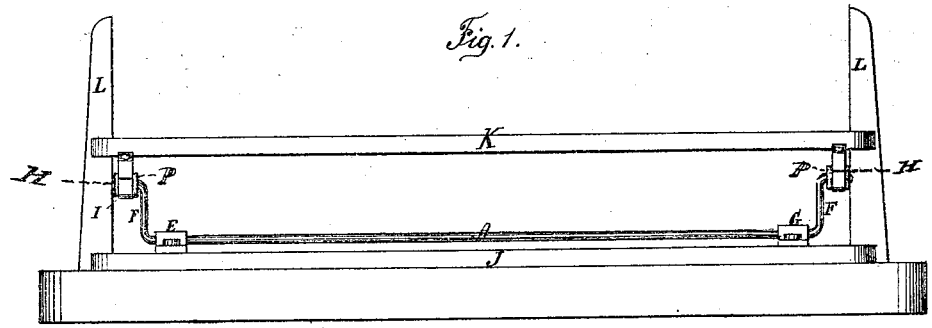

C. W. SALADEE.

Improvement in Torsion-Springs for Vehicles.

No. 132,696. Patented Oct. 29, 1872.

WITNESSES:
Herm Lauten.
Taylor Sims

INVENTOR:
C. W. Saladee

UNITED STATES PATENT OFFICE.

CYRUS W. SALADEE, OF ST. CATHARINES, CANADA, ASSIGNOR TO HIMSELF AND L. DOBBINS, OF ERIE, PENNSYLVANIA.

IMPROVEMENT IN TORSION-SPRINGS FOR VEHICLES.

Specification forming part of Letters Patent No. 132,696, dated October 29, 1872.

*To all whom it may concern:*

Be it known that I, CYRUS W. SALADEE, of St. Catharines, in the Dominion of Canada, have invented certain new Improvements in Torsional Springs for Vehicles, of which the following is a specification embodying my invention.

Nature and Object.

My present invention has for its object the application of a suitable friction-bearing for the outer ends of the lateral arms of torsional springs.

The Drawing.

Figure 2:
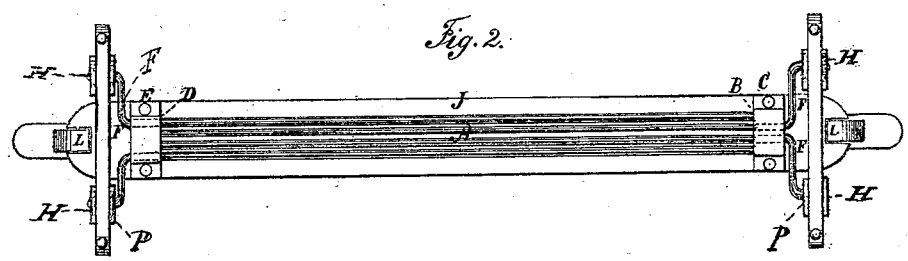
Figure 3:
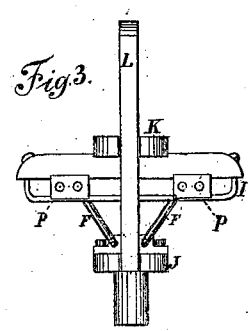

Figure 1 is a side elevation of torsional springs arranged upon the bolster of a wagon upon the plan of some of my former patents. Fig. 2 is a top view of the same. Fig. 3 is an end view, showing slides P and P, in which any number of arms F required may find a bearing.

These slides P have a flange on each side, and operate in guides I, as plainly seen in Fig. 3. This device of slides P is shown as applied to a common freight or lumber wagon, in combination with the outer ends of the lateral arms F, but my purpose is to use them in connection with torsional springs for railway cars and all other vehicles where the same may be found desirable.

Having thus described the nature and object of my said invention, what I claim as new, and desire to secure by Letters Patent, is as follows:

Claim.

In torsional springs, the friction-slides P and P, in combination with the outer ends of the lateral arms F, substantially as and for the purpose shown and described.

CYRUS W. SALADEE.

Witnesses:
    E. A. SALADEE,
    JOHN MURRAY.